United States Patent [19]

Craven

[11] 4,402,983
[45] Sep. 6, 1983

[54] POWDER COATING COMPOSITION FOR AUTOMOTIVE TOPCOAT

[75] Inventor: James M. Craven, Wilmington, Del.

[73] Assignee: E. I. Du Pont de Nemours & Co., Wilmington, Del.

[21] Appl. No.: 400,950

[22] Filed: Jul. 22, 1982

Related U.S. Application Data

[63] Continuation-in-part of Ser. No. 188,878, Sep. 19, 1980, abandoned.

[51] Int. Cl.$^3$ .............................................. C08K 5/34
[52] U.S. Cl. ................................... 428/335; 428/461; 428/463; 524/91; 524/99; 524/102; 524/265
[58] Field of Search .......................... 524/99, 102, 91; 428/463, 520, 461, 335; 427/27, 160, 221

[56] References Cited

U.S. PATENT DOCUMENTS

| | | | |
|---|---|---|---|
| 3,407,156 | 10/1968 | La Berge | 260/22 |
| 3,947,528 | 3/1976 | Wingler et al. | 427/27 |
| 3,953,644 | 4/1976 | Camelon | 428/220 |
| 3,954,779 | 5/1976 | Smith et al. | 260/293.65 |
| 3,969,327 | 7/1976 | Stein et al. | 526/1 |
| 3,993,655 | 11/1976 | Rasberger et al. | 260/293.64 |
| 3,993,849 | 11/1976 | Victorius | 428/463 |
| 4,009,131 | 2/1977 | Farone | 260/23 |
| 4,021,504 | 5/1977 | Conrad et al. | 427/27 |
| 4,076,917 | 2/1978 | Swift et al. | 526/49 |
| 4,091,048 | 5/1978 | Labana et al. | 260/836 |
| 4,102,943 | 7/1978 | Isaksen et al. | 260/850 |
| 4,107,139 | 8/1978 | Mayer et al. | 260/45.8 |
| 4,208,465 | 6/1980 | Chang | 428/416 |
| 4,289,686 | 9/1981 | Rody et al. | 524/99 |
| 4,346,144 | 8/1982 | Craven | 428/335 |

OTHER PUBLICATIONS

H. Vanoene: "The Influence of UV Stabilizers on the Kinetics of Radical Formation During Photolysis of Acrylic/Urethane Networks"–Advances in the Stabilization and Controlled Degradation of Polymers Conference, Jun. 26, 1980, State University of New York, New Paltz, N.Y.

*Primary Examiner*—Veronica P. Hoke
*Attorney, Agent, or Firm*—Hilmar L. Fricke

[57] ABSTRACT

A thermosetting acrylic powder coating composition contains an acrylic copolymer of a methacrylic acid and at least one other monoethylenically unsaturated monomer, a crosslinking agent capable of reacting with carboxylic acid groups, a blend of an ultraviolet light stabilizer and an ultraviolet screener capable of preventing degradation of the coating by ultraviolet light and a flow control agent. Preferably, the composition is nonpigmented and provides a clear, glossy, and durable film useful as the clear coat of a clear coat/color coat automobile finish.

13 Claims, No Drawings

POWDER COATING COMPOSITION FOR AUTOMOTIVE TOPCOAT

CROSS REFERENCE TO RELATED APPLICATIONS

This application is a continuation-in-part of Ser. No. 188,878 filed Sept. 19, 1980, now abandoned.

BACKGROUND OF THE INVENTION

Much of the research and development effort in the field of automotive finishes is currently directed to the search for coating compositions and methods of applying such compositions which not only will eliminate, or nearly eliminate, the release of organic solvents during heat curing but also will produce at a commercially feasible cost, coatings at least comparable in appearance and durability to conventional coatings.

A substantial amount of current research effort is likewise directed to the development of clear coat/color coat automotive finishes. It has been found that an excellent appearance, with depth of color and with metallic glamour, can be obtained by applying a transparent coat over a pigmented coat. Unfortunately, the durability of these transparent clear coats has left much to be desired. Often, checking, cracking, and flaking occur after relatively short periods of exposure to weathering, necessitating costly refinishing.

One solution to the solvent emission problem has been the replacement of liquid coating materials with coating materials in the form of dry, particulate solids, commonly called "powder" coatings. These compositions contain very low concentrations of volatile solvents, i.e., of the order of 2 percent or slightly higher, substantially less than any other paint system.

From an environmental standpoint, powder coatings have much to recommend them. Inherent in their use, however, are certain problems of production and application which have retarded the extent of their adoption. One problem occurs when powder coatings are used in conjunction with particulate metal particles, e.g., aluminum flakes. Automobiles coated with a so-called "metallic" finish, i.e., a topcoat of enamel or lacquer in which aluminum flakes as well as conventional pigments have been dispersed, have found wide acceptance in the marketplace. For the most part, the problems incidental to employing aluminum flakes in conventional liquid paints have been solved through years of experimentation and use. The problems associated with the use of aluminum flakes in dry powder are far from complex, particularly where some type of pulverizing step is involved in the paint manufacturing process or where electrostatic spray techniques are used to apply the paint to a substrate. Also, although increased use of powder coatings and improved manufacturing methods will undoubtedly result in a reduction of the present cost of quality powder coatings, the cost of producing such coatings in all of the colors demanded in the marketplace may continue to be prohibitive.

In view of the problems associated with colored powder coatings, particularly those containing metallic flakes, one approach has been to utilize a clear coat/color coat system wherein the transparent clear coat is composed of a nonpigmented powder coating while the color coat, often metallic, is composed of a conventional liquid paint. Such a system possesses a number of advantages. Use of a powder coating for the clear coat reduces the solvent emission level considerably, and, if desired, a water-based or high-solids coating material can be used for the color coat in order to further reduce the total emission level. Thus, an environmentally-acceptable finish can be achieved without sacrificing appearance or metallic glamour. Too, the production of nonpigmented powder coatings is markedly less complex and less expensive than the production of pigmented powder coatings.

Clear coat/color coat systems consisting of a powder clear coat over a conventional liquid color coat are known in the art, as shown by Camelon et al., U.S. Pat. No. 3,953,644, issued Apr. 27, 1976. However, such systems are not reinforced against the destructive effects of outdoor weathering and are thus susceptible to the checking, cracking, and flaking which commonly beset clear costs.

Conventional ultraviolet light screeners have sometimes been added to liquid clear coats in an attempt to retard the degradation caused by weathering, as shown by La Berge, U.S. Pat. No. 3,407,156, issued Oct. 22, 1968. Many of these conventional screeners are unsuitable for use in a powder coating because they lack special requirements, e.g., the capability of being ground to small particle size, of melting readily at the standard bake temperature for powder finishes, or of having sufficient permanence to remain in the coating film during baking and subsequent outdoor exposure. In addition, the use of conventional ultraviolet light screeners is in some polymer systems less than satisfactory: the durability of certain clear coats so reinforced will be increased for a short period of time, but not to the extent required for a practical automotive finish.

Thus, there is a continued need for nonpigmented powder coating compositions which will provide clear coats characterized by both excellent appearance and the capability to adequately withstand long periods of outdoor weathering.

SUMMARY OF THE INVENTION

There is provided by the present invention a thermosetting powder coating composition of finely divided particles having a particle size of about 1 to 100 microns, wherein the particles are an intimately mixed blend consisting essentially of:

A. an acrylic copolymer having 3 to 10 carboxylic acid groups per polymer chain and consisting essentially of
  (1) about 5 to 30 percent by weight, based on the weight of the copolymer, of methacrylic acid, and
  (2) about 70 to 95 percent by weight, based on the weight of the copolymer, of other monoethylenically unsaturated monomers which are selected from or a mixture of the following:
    (a) styrene or α-methylstyrene, and
    (b) at least one ester of acrylic or methacrylic acid having the formula

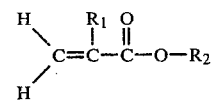

where $R_1$ is selected from the group consisting of hydrogen and the methyl radical, and $R_2$ is selected from the group consisting of $C_1$–$C_{20}$ aliphatic hydrocarbon radicals, wherein the copolymer has a number average molecular weight of about 2,000 to 8,000, a weight average molecular weight of about 4,000 to 16,000, and a glass transition temperature of about 40° C. to 100° C.;

B. a crosslinking agent capable of reacting with carboxylic acid groups of the acrylic copolymer, said crosslinking agent being present in an amount sufficient to provide 0.7 to 1.5 carboxyl-reactive functional groups for each carboxylic acid group originally in the copolymer; and C. agents capable of preventing the degradation of the coating by ultraviolet light; and D. a flow control agent.

DETAILED DESCRIPTION OF THE INVENTION

The thermosetting acrylic powder coating composition of the present invention, particularly suitable for use as the clear coat of a clear coat/color coat automotive finish, provides coatings possessing a combination of resistance to outdoor weathering, smoothness, distinctness of image, and a high level of gloss, a combination that has heretofore only been available in liquid clear coats. These properties are obtained without sacrifice of storage stability, hardness, or humidity/cold crack resistance.

The powder coating composition is composed of an acrylic copolymer of monoethylenically unsaturated monomers, a crosslinking agent, ultraviolet light stabilizers and screeners and a flow control agent. It can also contain a reaction catalyst to decrease the curing time, as well as any of the various additives that are advantageously used in automotive coating compositions.

The coating composition of this invention contains an acrylic polymer having a glass transition temperature of about 40° C. to 100° C., and preferably 50° C. to 90° C. This glass transition temperature results in a storage-stable, free-flowing powder which will flow upon baking to form an exceptionally smooth and glossy finish.

The coating composition of this invention is in the form of powder particles with a particle size, or average linear dimension, of about 1 to 100 microns and preferably, to provide a high quality finish, a particle size of 10 to 75 microns. While the powder particles will ordinarily be nonpigmented, it is acceptable, for clear coat use, to incorporate transparent particles, i.e., pigments having a refractive index the same as or similar to the refractive index of the film-forming constituents. Such pigments should have a particle size of about 0.015 to 50 microns and should be used in a pigment-to-powder weight ratio of about 1/10 to 1/100. Conventional pigments, e.g., inorganic pigments, metallic powders and flakes, organic dyes, organic pigments, and flakes, may also be added, in these same weight ratios, if the coating composition is to be employed other than as the clear coat of a clear coat/color coat finish.

The acrylic copolymer utilized in the powder coating composition of this invention has a number average molecular weight of about 2,000 to 8,000, preferably 3,000 to 6,000, and a weight average molecular weight of about 4,000 to 16,000, preferably 6,000 to 12,000. The number average molecular weight and the weight average molecular weight of the copolymer are determined by gel permeation chromatography, in tetrahydrofuran, using as a standard polymethyl methacrylate having a number average molecular weight of 43,000 and a weight average molecular weight of 100,000.

The acrylic copolymer is prepared by conventional solution, emulsion, or bead polymerization techniques, and by using conventional polymerization catalysts. Preferred are bead polymerization, as disclosed in W. R. Sorenson and T. W. Campbell, *Preparative Methods of Polymer Chemistry*, Interscience Publishers, New York, second edition, 1968, page 254, and solution polymerization. Preparation of the copolymer by solution polymerization is discussed in greater detail in the examples, infra.

Generally, the acrylic copolymer consists of about 5 to 30 percent by weight, based on the weight of the copolymer, of methacrylic acid and about 70 to 95 percent by weight of other monoethylenically unsaturated monomers. The copolymer possesses 3 to 10, and preferably 4 to 6, carboxylic acid groups per polymer chain.

In addition to methacrylic acid, the copolymer contains other monoethylenically unsaturated monomers which are selected from, or a mixture of, styrene, or α-methylstyrene, and at least one ester of acrylic or methacrylic acid having the formula

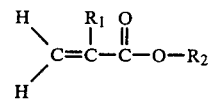

where $R_1$ is hydrogen or the methyl radical and $R_2$ is an aliphatic hydrocarbon radical having 1 to 20 carbon atoms. Esters of methacrylic acid are preferred. Also preferred are mixtures of methacrylic acid esters and styrene containing up to 25 percent by weight, based on the weight of the mixture, of styrene.

Durable high quality automotive finishes are provided by powder coating compositions that contain an acrylic copolymer of methyl methacrylate, n-butyl methacrylate, and methacrylic acid. A copolymer composed of about 40 to 95 percent by weight of methyl methacrylate, 0 to 55 percent by weight of n-butyl methacrylate and 5 to 15 percent by weight of methacrylic acid is effective in the coating composition of this invention, although a copolymer of 40 to 60 percent by weight of methyl methacrylate, 25 to 55 percent by weight of n-butyl methacrylate, and 5 to 15 percent by weight of methacrylic acid is preferred. A highly recommended and particularly useful copolymer contains about 50 percent by weight of methyl methacrylate, about 40 percent by weight of n-butyl methacrylate, and about 10 percent by weight of methacylic acid.

A crosslinking agent, capable of reacting with carboxylic acid groups, is present in an amount sufficient to provide 0.7 to 1.5 carboxyl-reactive functional groups for each carboxylic acid group originally in the copolymer.

One preferred class of crosslinking agents consists of compounds containing two or more epoxy groups, particularly useful are hydrantoin epoxides containing 2 to 4 epoxide groups and cycloaliphatic epoxides.

Preferred hydrantoin epoxides are those having one of the following formulas

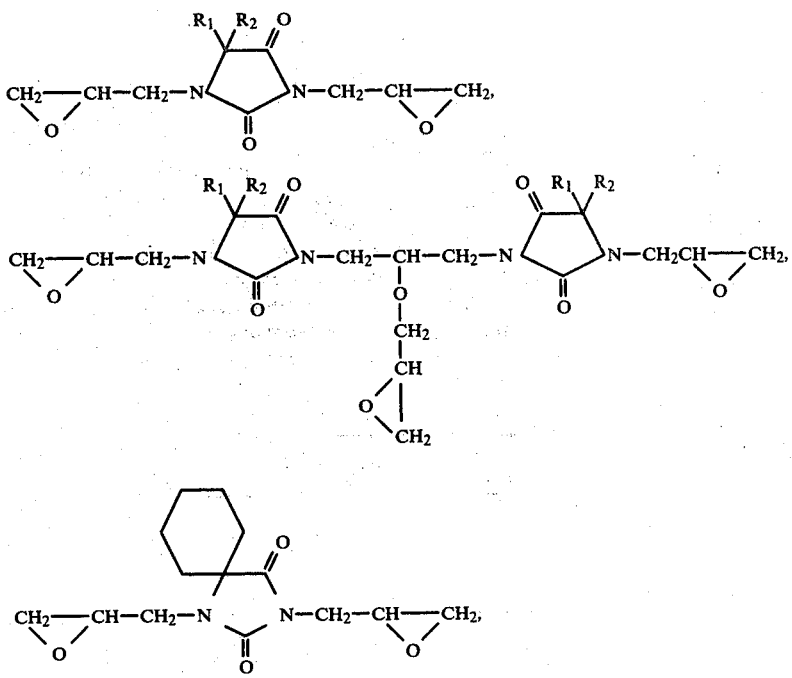

where $R_1$ and $R_2$ are aliphatic hydrocarbon radicals having 1 to 10 carbon atoms.

Preferred cycloaliphatic epoxides are those having either of the following formulas

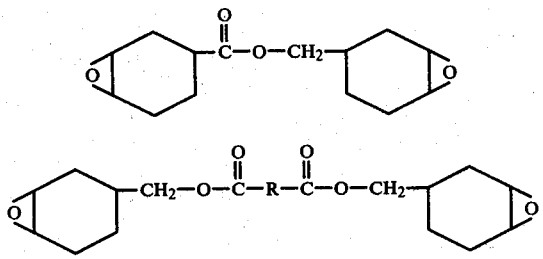

where R is a bivalent aromatic hydrocarbon radical having 6 to 10 carbon atoms or a bivalent aliphatic hydrocarbon radical having 2 to 20 carbon atoms.

A second preferred class of crosslinking agents consists of disubstituted oxazolines and trisubstituted oxazolines. Preferred are those with the formula

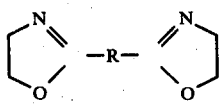

where R is a bivalent aliphatic hydrocarbon radical having 2 to 20 carbon atoms or a bivalent aromatic hydrocarbon radical having 6 to 10 carbon atoms.

The powder coating composition of the present invention is fortified with at least one ultraviolet light stabilizer or ultraviolet screener to prevent degradation of the resultant finish by ultraviolet light. The powder coating composition contains about 0.6 to 10 percent by weight, based on the total weight of the composition, of this combination, preferably about 0.3 to 5 percent by weight of a hindered amine light stabilizer and about 0.3 to 5 percent by weight of an ultraviolet screener. Both the ultraviolet screener and the hindered amine light stabilizer should have a weight average molecular weight greater than 300, preferably greater than 400, and a particle size of less than 40 microns, preferably less than 20 microns. Preferred ultraviolet screeners are 2-(o-hydroxyphenyl)benzotriazoles, nickel chelates, o-hydroxybenzophenones, or phenyl salicylates. Most preferred are the 2-(o-hydroxyphenyl)benzotriazoles. The hindered amine light stabilizer can be either monomeric or polymeric, althought the latter are preferred from a permanence standpoint.

Hindered amine light stabilizers provide greater efficiency at economical use levels than, for instance, nickel organics and benzophenones. It has been estimated that as much as four times longer product life can be expected from products reinforced with the hindred amines than from products reinforced with conventional ultraviolet screeners and stabilizers. Despite their good light stabilization characteristics, hindered amine light stabilizers are nevertheless more effective in many polymer systems when used in conjunction with certain conventional ultraviolet screeners. The combination of a hindered amine light stabilizer and an o-hydroxyphenyl benzotriazole is preferred for use in the coating compositions of the present invention, and is especially preferred in those compositions containing an acrylic copolymer of methyl methacrylate, n-butyl methacrylate, and methacrylic acid. An apparent synergistic effect resulting from the combination of the hindered amine light stabilizer and the o-hydroxyphenyl benzotriazole imparts exceptional durability to the clear powder coat of this invention.

If desired, a catalyst for the reaction between the carboxylic acid groups of the copolymer and the functional groups of the crosslinking agent may be used to decrease the curing time or temperature. For compositions containing an epoxide crosslinking agent, tin compounds, e.g., stannous octoate, dibutyltin dilaurate, and triphenyltin chloride, are preferred as catalysts. Ordinarily, catalysts will be present in an amount up to about 4 percent by weight, based on the weight of the film-forming blend.

The coating composition may also contain certain other additives that are typically incorporated into powder coating compositions. Particularly recommended are antipopping agents, which allow volatiles to gently escape from the film during baking, and flow control agents, which prevent cratering of the finish. Benzoin is the highly preferred antipopping agent and is present in an amount ranging from about 0.5 percent by weight to 1.0 percent by weight, based on the weight of the total powder composition.

The flow control agent is present in an amount ranging from about 0.05 percent by weight to 5.0 percent by weight. One preferred flow control agent is alkylene oxide modified dimethyl polysiloxane fluid. Other useful flow control agents include those disclosed in Labana et al., U.S. Pat. Nos. 4,091,048 and 4,091,049, issued May 23, 1978, e.g., acrylic polymers such as polylauryl acrylate, polybutyl acrylate, poly(2-ethylhexyl acrylate), polylauryl methacrylate, and polyisodecyl methacrylate, and fluorinated polymers such as the esters of polyethylene glycol or polypropylene glycol, and fluorinated fatty acids.

The powder coating composition of this invention can be applied directly to a metal, glass, plastic, or fiber-reinforced plastic substrate or to one which has been primed and/or sealed in a conventional manner. An electrically conductive carbon black pigment may be added to the primer or sealer to make the surface conductive and to promote uniform deposition of the powder during spraying. Application of the powder can be by electrostatic spraying or by use of a fluidized bed. Preferred is electrostatic spraying wherein a negative charge of 20 to 100 kilovolts is applied to the spray gun. The powder composition can be applied either in one pass or in several passes to provide a film thickness, after cure, of about 0.5 to 5 mils. Preferably, to provide a high quality finish of reasonable cost, the thickness of the clear powder coat is about 1.2 to 4 mils and, more preferably, 1.4 to 3 mils.

The substrate to be coated can, optionally, be preheated prior to the application of the powder to promote more uniform powder deposition. Upon application of the powder, the powder-coated substrate is baked at 250° F. to 350° F. for 20 to 60 minutes. Preferably, for the powder coating composition of the present invention, substrates are baked for 30 minutes at 350° F.

The present invention will be more fully understood from the following illustrative examples, wherein all quantities, percentages, and ratios are on a weight basis unless otherwise indicated.

EXAMPLE 1

| Preparation of Acrylic Copolymers | |
|---|---|
| Initial Charge | |
| Methyl methacrylate | 50.00 |
| n-Butyl methacrylate | 39.82 |
| Methacrylic acid | 5.20 |
| Methyl ethyl ketone | 42.00 |
| 1-Dodecanethiol | 4.90 |
| Initiator Feed | |
| Azobisisobutyronitrile | 5.46 |
| Methyl ethyl ketone | 40.94 |
| Monomer Feed | |
| Methyl methacrylate | 50.00 |
| n-Butyl methacrylate | 40.18 |

| -continued | |
|---|---|
| Preparation of Acrylic Copolymers | |
| Methacrylic acid | 14.80 |
| Dilution Solvent | |
| Acetone | 55.92 |
| | 349.22 |

The initial charge is placed in a four-neck round bottom flask equipped with a mechanical stirrer, a condenser, and two graduated addition funnels containing the initiator feed and the monomer feed. The initial charge is heated to reflux, with stirring, at which time the initiator feed and monomer feed are added by a series of constant rate additions according to the following schedule:

| Time | Percentage of Total Added | |
|---|---|---|
| (Minutes) | Initiator Feed | Monomer Feed |
| 0 | 0 | 0 |
| 20 | 8.6 | 16.8 |
| 40 | 42.6 | 51.4 |
| 70 | 93.5 | 80.6 |
| 90 | 100.00 | 100.0 |

During the additions, the polymerization mixture is continuously stirred and kept at reflux. After the initiator feed and monomer feed have both been added, the polymerization mixture is kept at reflux, with stirring, for 30 minutes more. The mixture is then cooled to room temperature and the dilution solvent is added to give a nominal 60 percent solution of the acrylic copolymer. The acrylic copolymer thus prepared is obtained with 99 percent conversion of the monomers and has a number average molecular weight of 4100 and a weight average molecular weight of 8100. The copolymer contains 1.12 milliequivalents of carboxylic acid for each gram of solid copolymer or, on the average, about 4.6 carboxylic acid groups per polymer chain.

The acrylic copolymer is isolated by evaporation of the solvent at 40° C. under vacuum. After cooling, the copolymer is ground to a powder.

| Preparation of Powder Coating Composition | |
|---|---|
| Acrylic copolymer (prepared above) | 86.40 |
| Hydantoin epoxide (6 micron average particle size) | 13.60 |

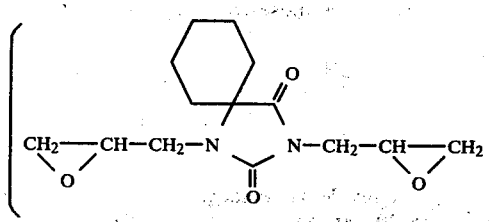

| | |
|---|---|
| Benzoin (6 micron average particle size) | 0.50 |
| Alkylene oxide modified dimethyl siloxane fluid | 0.50 |
| CGL-900 o-hydroxyphenylbenzotriazole ultraviolet light absorber (available from Ciba-Geigy Corporation) (7 micron average particle size) | 2.00 |
| "Tinuvin" 144 hindered amine light stabilizer (available from Ciba-Geigy Corporation) (10 micron average particle size) | 1.00 |

| -continued | |
| --- | --- |
| Preparation of Powder Coating Composition | |
| | 104.00 |

The powder coating composition is prepared from the above components by blending in a planetary mixer for 30 minutes, melt blending on a 2-roll mill for 10 minutes at 170° F., grinding in a micro mill, and sieving through a 200 mesh screen.

The powder clear coating composition thus prepared is electrostatically sprayed over a color-coated automotive substrate and baked for 30 minutes at 350° F.

The resultant coating exhibits excellent resistance to weathering and good appearance.

EXAMPLE 2

| Acrylic copolymer (as prepared in Example 1) | 89.20 |
| --- | --- |
| 2,2'-(1,3-Phenylene)bis(2-oxazoline) (6 micron average particle size) | 10.80 |
| Benzoin (6 micron average particle size) | 0.50 |
| Alkylene oxide modified dimethyl siloxane fluid | 0.50 |
| CGL-900 (7 micron average particle size) | 2.00 |
| "Tinuvin" 622 (10 micron average particle size) | 1.00 |
| | 104.00 |

Preparation and application of this powder coating composition follow the procedures outlined in Example 1, and comparable results are obtained.

The invention claimed is:

1. A thermosetting powder coating composition of finely divided particles having a particle size of about 1 to 100 microns, wherein the particles are an intimately mixed blend consisting essentially of:
A. an acrylic copolymer having 3 to 10 carboxylic acid groups per polymer chain and consisting essentially of
   (1) about 5 to 30 percent by weight, based on the weight of the copolymer, of methacrylic acid, and
   (2) about 70 to 95 percent by weight, based on the weight of the copolymer, of other monoethylenically unsaturated monomers which are selected from or a mixture of the following:
      (a) up to 25% by weight, based on the weight of the copolymer, of styrene or α-methylstyrene, and
      (b) at least one ester of acrylic or methacrylic acid having the formula

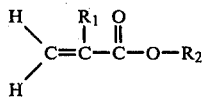

where $R_1$ is selected from the group consisting of hydrogen and the methyl radical, and $R_2$ is selected from the group consisting of $C_1$-$C_{20}$ aliphatic hydrocarbon radicals, wherein the copolymer has a number average molecular weight of about 2,000 to 8,000, a weight average molecular weight of about 4,000 to 16,000, and glass transition temperature of about 40° C. to 100° C.;
B. a crosslinking agent capable of reacting with carboxylc acid groups of the copolymer, said crosslinking agent being present in an amount sufficient to provide 0.7 to 1.5 carboxyl-reactive functional groups for each carboxylic acid group originally in the copolymer, said crosslinking agent further being selected from the group consisting of hydantoin epoxides containing 2 to 4 epoxide groups, and disubstituted and trisubstituted oxazolines;
C. agents capable of preventing the degradation of the coating by ultraviolet light consisting essentially of about 0.3 to 5 percent by weight, based on the weight of the acrylic copolymer, of an ultraviolet screener and about 0.3 to 5 percent by weight, based on the weight of the acrylic copolymer, of a hindered amine light stabilizer, said agents having a weight average molecular weight greater than 400 and a particle size of less than 20 microns and
D. about 0.05 to 2.0 percent by weight, based on the weight of the powder coating compositions, of a flow control agent.

2. The powder coating composition of claim 1 which contains at least one ester of methacrylic acid.

3. The powder coating composition of claim 1 which contains a mixture of styrene and at least one ester of methacrylic acid, said mixture comprising up to 25 percent by weight, based on the weight of the mixture, of styrene.

4. The powder coating composition of claim 1 which contains about 40 to 95 percent by weight, based on the weight of the acrylic copolymer, of methyl methacrylate, 0 to 55 percent by weight of n-butyl methacrylate, and 5 to 15 percent by weight of methacrylic acid.

5. The powder coating composition of claim 4 which contains 40 to 60 percent by weight of methyl methacrylate, 25 to 55 percent by weight of n-butyl methacrylate, and 5 to 15 percent by weight of methacrylic acid.

6. The powder coating composition of claim 1 wherein the ultraviolet screener is selected from the group consisting of 2-(o-hydroxyphenyl)benzotriazoles, nickel chelates, o-hydroxybenzophenones, and phenyl salicylates.

7. The powder coating composition of claim 5 which contains 1 to 3 percent by weight, based on the weight of the acrylic copolymer, of a 2-(o-hydroxyphenyl)benzotriazole and about 0.5 to 2 percent by weight of a hindered amine light stabilizer.

8. The powder coating composition of claim 5 which contains in addition to the aforementioned constituents up to about 4 percent by weight, based on the weight of the total powder composition, of a catalyst for the reaction between the carboxylic acid groups of the copolymer and the functional groups of the crosslinking agent.

9. The powder coating composition of claims 1 or 9 which contains in addition to the aforementioned constituents about 0.05 percent by weight to 1.0 percent by weight, based on the weight of the total powder composition, of benzoin.

10. The powder coating composition of claim 1 wherein the flow control agent is a fluorinated polymer.

11. The powder coating composition of claim 1 wherein the flow control agent is an alkylene oxide modified dimethyl polysiloxane fluid.

12. A substrate coated with a pigmented liquid coating composition and subsequently coated with a transparent powder coating composition according to claim 1 to form a clear coat/color coat finish.

13. The coated article of claim 12 wherein the thickness of the cured powder coating composition is about 1.2 to 3 mils.

* * * * *